Patented May 28, 1935

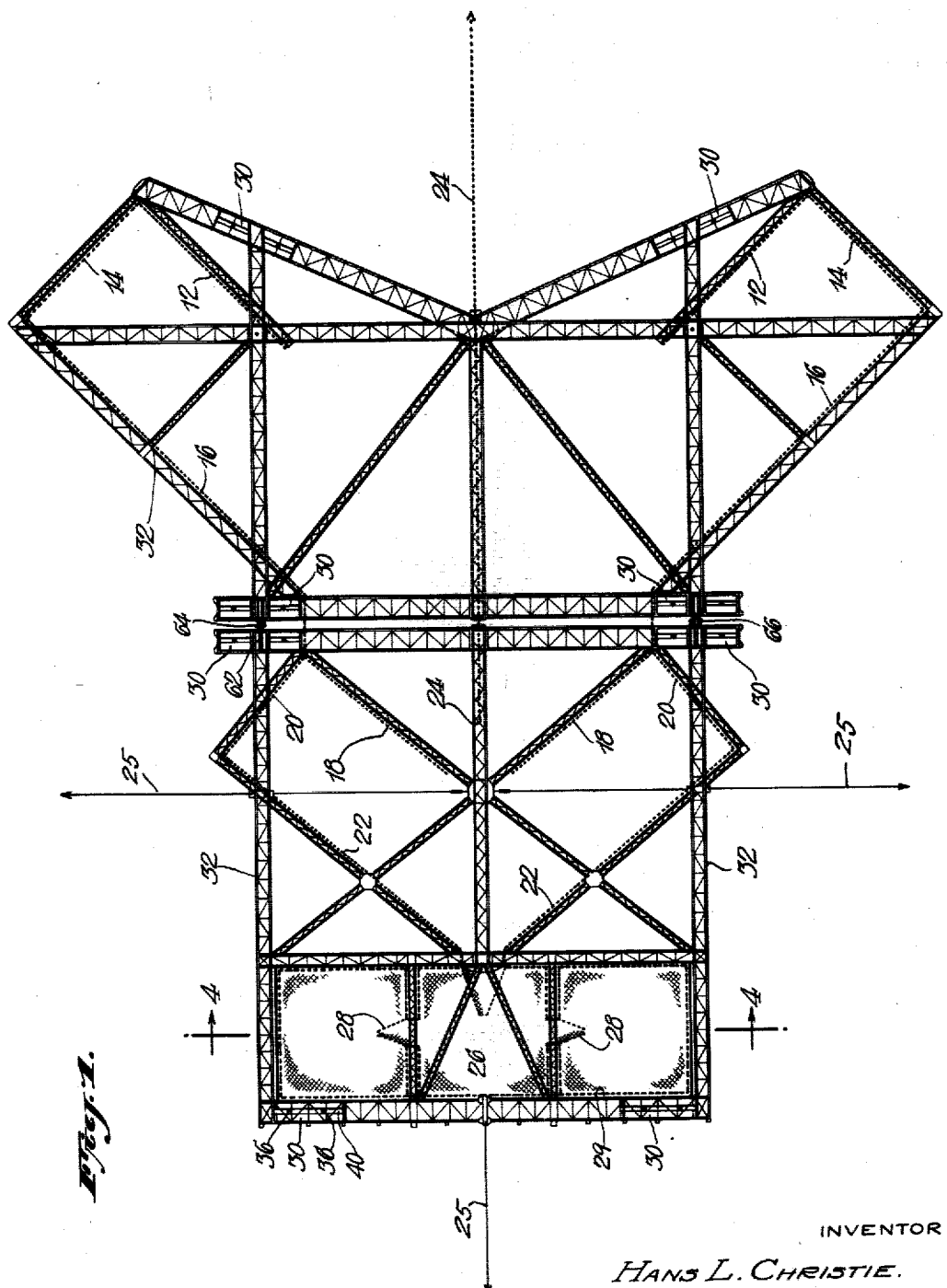

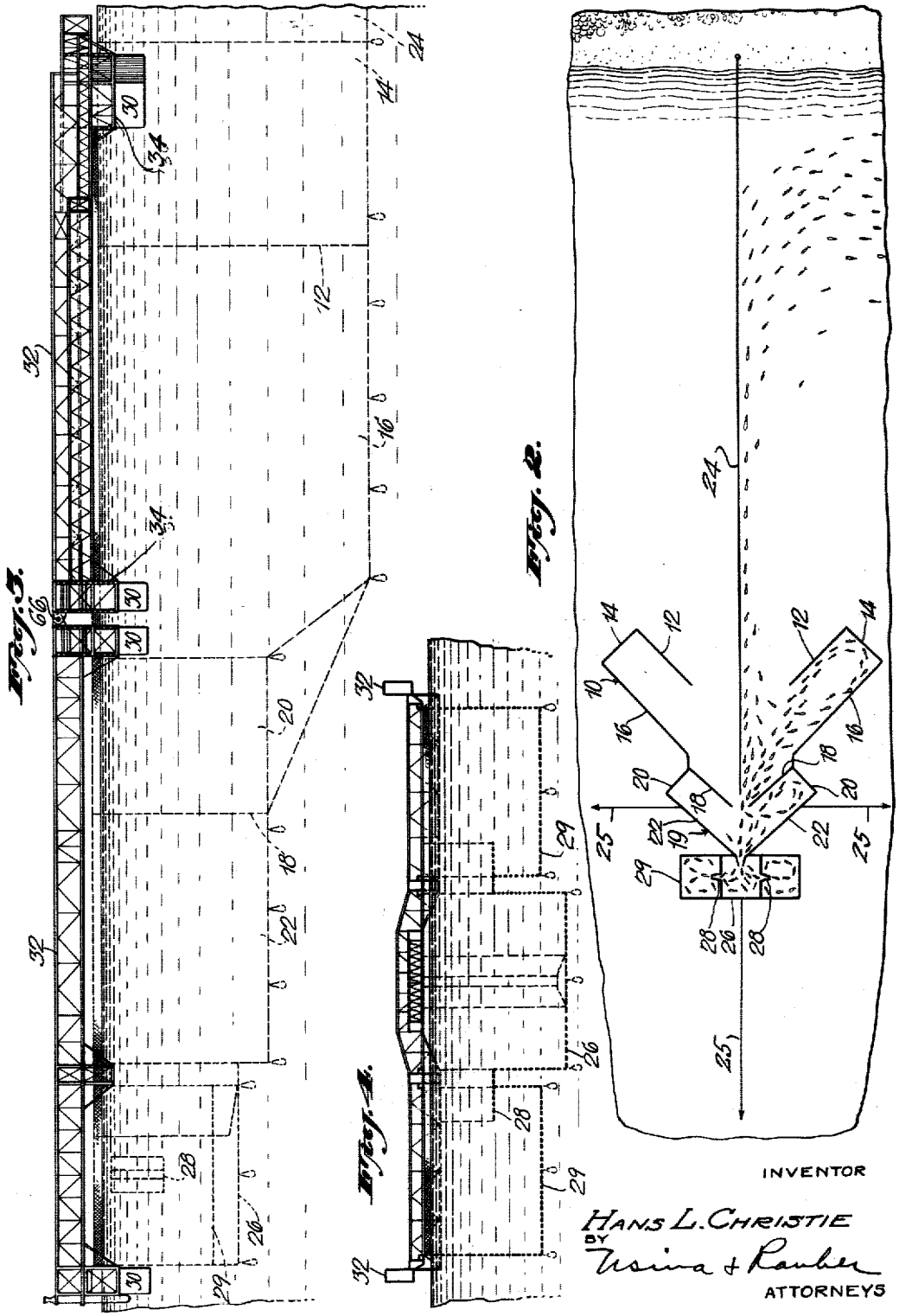

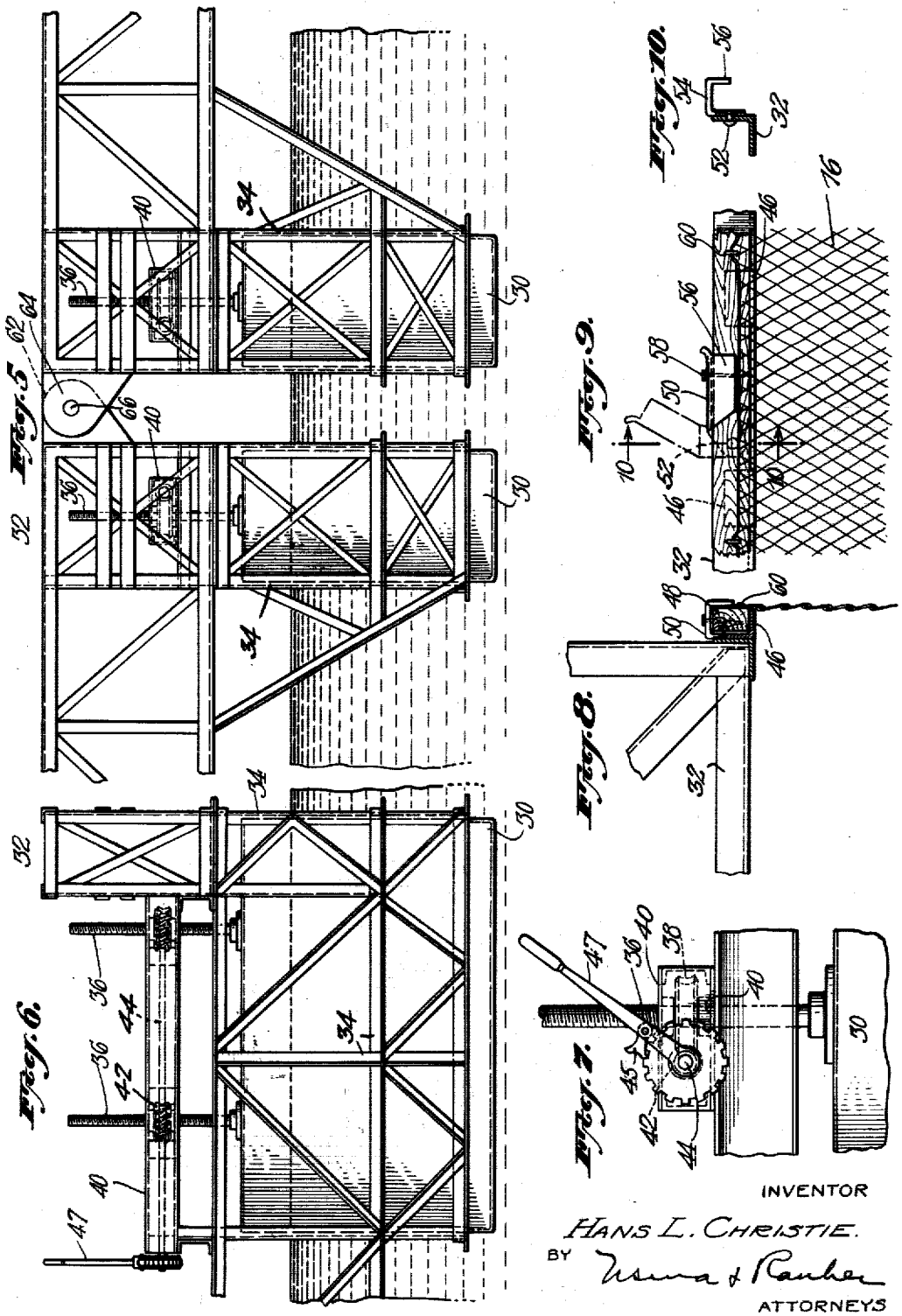

2,002,882

UNITED STATES PATENT OFFICE 2,002,882

FLOATING FISH TRAP

Hans L. Christie, Los Angeles, Calif.

Application June 6, 1934, Serial No. 729,330

9 Claims. (Cl. 43—102)

This invention relates to improvements in fish traps of great size such as used in making large catches of fish. While not limited thereto, the fish trap of my invention is well suited for use in salmon fisheries.

Heretofore, the nets of fish traps have been supported by logs constituting a raft, the raft being anchored by suitable anchor cables at a desired location and the nets being fastened by lashing or other crude means to the logs of the raft. With such raft or log supports, the entire raft is subjected to movement by the tide or the waves. This gives rise to strain on the anchor cables. There are also objectionable features due to the necessity of fastening the nets constituting the trap close to the water.

My present invention provides net supporting members positioned above the water level by a series of pontoons and includes means whereby the frames may be adjusted as to elevation above the water. Thus the net supporting frames of my invention do not present such a great surface area to the action of the waves or tide and less strain is put on the anchor cables than is the case where the old types of wooden rafts are used.

I also provide means whereby the nets constituting the fish trap are secured to timbers which can be readily assembled with respect to the pontoon supported frames and can also be readily detached and cast adrift, thus effecting a saving in labor cost of this operation. The foregoing and further features of the invention will be apparent from the following specification when read in connection with the accompanying drawings.

In the drawings—

Fig. 1 is a plan view of a fish trap embodying the invention; Fig. 2 is a diagram in plan showing the arrangement of the nets; Fig. 3 is a side elevation of the trap; Fig. 4 is a view from the left end of Fig. 1; Fig. 5 is an enlarged detail illustrative of the adjustable connection between pontoons and the net supporting frames and also showing a hinge joint between two sections of the trap; Fig. 6 is an elevation from the left of Fig. 5; Fig. 7 is a detail view illustrating the ratchet drive of parts shown in Fig. 5; Figs. 8 to 10 inclusive are enlarged details illustrating the quick detachable connection for net supporting timbers.

Referring in detail first to Fig. 2 of the drawings, the trap includes a series of nets forming two generally heart-shaped portions. The first called the outer heart is indicated at 10. This includes the net portions 12, 14, 16, and 18. The inner heart 19 includes net portions 20 and 22. The portions 12 and 18 converge inwardly and there is a lead net 24 adapted to direct the run or school of fish into the outer heart, as indicated diagrammatically by the fish representations in this figure. Anchor cables 25 hold the trap in the position desired.

The inclined members 22 of the inner heart direct the fish to a so-called pot, which, as illustrated, is in the form of a substantially rectangular net 26. There are outwardly converging outlet net portions 28, which direct the fish into the spiller nets 29. These nets are adapted to be lifted by suitable winch mechanism and the contents dumped into a suitable baling scow. No particular claim is laid to the heart shaped net formation, nor to the arrangement of the pot and spiller nets, the present invention being chiefly concerned with the means for supporting the net-carrying frames on pontoons above the water level and to the juxtaposition between the frames and the pontoons and also to quick detachable means for releasing the timbers, to which the nets are secured, above the water level. The net supporting frames are preferably formed of structural steel members. They may be of lattice formation, as indicated in the drawings. For example, we have shown the net supporting frames at 32 located above the water level and adjustably supported with respect to the pontoons 30. Secured to the supporting frame structure 32, there is a cage 34 (see Figs. 5 and 6). This cage is in the form of a skeleton frame built up of a series of suitably braced structural steel members and being arranged to slidably coact with the pontoon 30, so as to permit of a relative vertical adjustment with respect to the pontoon. The connection between the frame member 32 and the pontoon is shown by way of example in Figs. 5 and 6 to include screw threaded rods 36 secured to the upper face of the pontoon.

The rods engage nuts, which are shown in the form of worm gears 38 positioned by members 40, carried by a superstructure secured to the cage 34. The worm gears are adapted to be turned by worms 42 carried by shaft 44 arranged to be actuated by a ratchet and pawl mechanism 45 upon the oscillation of a hand lever 47. It will thus be seen that, by manipulation of the lever 47, the nuts 38 can be rotated so as to vary the vertical adjustment between the frame 32 and the pontoons 30, which float in the body of water where the trap is located. The ratchet is square toothed, as shown, and the pawl on lever 47 is double toothed and adapted to be reversed so that the worms 42 can be reversely operated in order to raise or lower the frame with relation to the pontoons.

To facilitate supporting the nets from the metal frame, I preferably provide wooden timbers and means for quickly initially engaging the timbers with the frame and for quickly disengaging them. As best shown in Figs. 8 to 10 inclusive, angle brackets or lugs 46 are secured at spaced intervals to the metal frame member. These lugs serve as rests for wooden timbers 48. The timbers are not permanently fastened to the steel frames, but are removably secured by means of latches, of the character shown in Figs. 9 and 10. The timber securing latch 50 is pivoted at 52 to one of the structural elements of the frame member 32, the latch having a horizontally extending portion 54 adapted to overlie the top of the timber and a downwardly depending portion 56 to be engaged over the outer face of the timber, so as to normally prevent the same from moving laterally outward and off its supporting lugs 46. Usually a nail, as indicated at 58, will be driven through a suitable hole in the latch and into the timber so as to prevent accidental tripping of the latch.

The net will be secured to the timber by staples 60. The provision of the latch held timbers provides means whereby the nets can be fastened to the timbers either on shore or in a convenient working position above the water level and the assembled timber and net can then be supported on the frame lugs 46 and held by the latches, the latter being nailed down with light weight nails.

The fish traps of my invention are of large size. For example, in the major dimension they may measure over all approximately two hundred and twenty odd feet and in width about two hundred and ten feet. Thus the distance between pontoons at the extremities of the trap will be such that wave motion might be transmitted from one end of the structure to the other. To compensate or to somewhat negative the effect of such wave motion, I deem it advantageous to build the trap in sections. For this reason, I support the outer heart section on one group of pontoons and the inner heart section on another group of pontoons and hingedly or flexibly connect the two sections. Such flexible connection is illustrated in Fig. 5, wherein the ears 62 and 64 of the adjacent sections are coupled by a hinge pin 66. Thus the outer heart section can move relatively to the inner heart section and vice versa.

The various metallic frame members may be formed in readily dismountable units so that the parts, if desired, can be assembled on shore and towed in position to the fishing ground. If desired, such frame parts can be transported in sections by boat and assembled over the water by first placing the pontoons and assembling them and separate frame members 32 in proper sequence, so that the pontoon members will floatingly support the elements during the process of erection.

The fish netting supported from the wood timbers may be used for a considerable length of time in a given location. But, in time it becomes badly damaged and requires replacement. The quickly detachable latches above described facilitate such replacement, it merely being necessary to pry the latches upwardly by the use of a crow bar, boat hook, or the like, thus pulling the temporary holding nail and moving the latch to released position, whereupon the timber 48 and the used net secured thereto can be readily cast adrift. Of course, if desired, the timbers could be reused by stripping the nets therefrom. If this is desired, the latches permit the lifting of the timbers to a point where they are readily accessible.

From the drawings and description, it is clear that the net supporting frame is made of metallic members, such as rolled steel structural sections and that the elements of the frame are so disposed as to conform generally to the contour of the inner and outer hearts of the fish trap, such members of the metallic frame elements spanning the distance between the pontoons. The steel work is of skeleton form comprising various combinations of spaced angles or channels connected by lattice members in ways which are familiar to those skilled in the art of steel framework fabrication.

While I have described quite precisely certain specific details of the embodiment of the invention herein illustrated, it is not to be constructed that I am limited thereto since various modifications and substitutions of equivalents may be made by those skilled in the art without departure from the invention as defined in the appended claims.

What I claim is:—

1. A floating fish trap comprising buoyant members adapted to float in a body of water, a metal net supporting frame maintained above the water level thereby having cages slidably coacting with said buoyant members and adjustable means connecting the metal frames with said buoyant members.

2. A floating fish trap comprising a plurality of buoyant members, a framework maintained above the water level, cages secured to the framework and slidable relatively to said buoyant members, and means for adjusting the framework vertically relatively to said members.

3. A floating fish trap comprising a plurality of buoyant members, a net supporting frame maintained above the water level thereby, and supporting means for the latter adjustable vertically with relation to said buoyant members.

4. A floating fish trap comprising a plurality of pontoons adapted to float in a body of water, a net supporting frame maintained above the water level thereby and having guide members slidably engaging said pontoons and means for vertically adjusting the frame members in relation to said pontoons.

5. A floating fish trap comprising a plurality of pontoons, net supporting frames, guide means secured to the frames and slidingly cooperating with said pontoons, screw threaded rods, nuts coacting therewith, drive means for effecting a relative motion between said screw threaded rods and nuts whereby vertical relationship between the frame members and the pontoons can be varied at will.

6. A floating fish trap comprising a plurality of pontoons, metal supporting frames maintained above the water level by said pontoons, brackets carried by the frame members, net carrying timbers engaging said brackets, and quick detachable latches on the metal supporting frames for removably positioning the timbers on the brackets and adapted to facilitate initially assembling the timbers and ultimately casting them adrift.

7. A floating fish trap comprising pontoons adapted to float in a body of water, a metal framework supported by said pontoons, wood timbers having nets secured thereto resting on members carried by the metal frame, and quick detachable latches normally retaining the timbers in place and adapted to be readily tripped to facilitate casting the timbers and the nets carried thereby adrift.

8. A fish trap comprising a metal supporting frame, members carried thereby wood timbers having nets secured thereto resting on said members, and quick detachable latches normally retaining the timbers in place and adapted to be readily tripped to facilitate casting the timbers and the nets carried thereby adrift.

9. A floating fish trap comprising two groups of floating pontoons, respective net supporting frames carried by each group of pontoons and a hinge joint connecting the two frames.

HANS L. CHRISTIE.